US009890649B2

(12) United States Patent
Thomassin et al.

(10) Patent No.: US 9,890,649 B2
(45) Date of Patent: Feb. 13, 2018

(54) INLET GUIDE ASSEMBLY

(71) Applicant: Pratt & Whitney Canada Corp., Longueuil (CA)

(72) Inventors: Jean Thomassin, Sainte-Julie (CA); Marie-Claude Vallieres, St-Lambert (CA); Mike Fontaine, Boucherville (CA); Andre Julien, Sainte-Julie (CA); John Perera, Naples, FL (US)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 134 days.

(21) Appl. No.: 15/010,634

(22) Filed: Jan. 29, 2016

(65) Prior Publication Data
US 2017/0218783 A1 Aug. 3, 2017

(51) Int. Cl.
*F01D 9/00* (2006.01)
*F01D 9/04* (2006.01)
*F01D 5/02* (2006.01)
*F01D 5/12* (2006.01)
*F02B 37/00* (2006.01)
*F02B 53/08* (2006.01)
*F01D 1/02* (2006.01)
*F02B 53/00* (2006.01)
*F01D 17/12* (2006.01)

(52) U.S. Cl.
CPC ............. *F01D 9/041* (2013.01); *F01D 1/026* (2013.01); *F01D 5/02* (2013.01); *F01D 5/12* (2013.01); *F02B 37/00* (2013.01); *F02B 53/08* (2013.01); *F01D 17/12* (2013.01); *F02B 2053/005* (2013.01); *F05D 2220/40* (2013.01)

(58) Field of Classification Search
CPC ... F01D 1/026; F01D 5/02; F01D 5/12; F01D 9/041; F01D 17/12; F01D 2220/40; F02B 37/00; F02B 53/08; F02B 2053/005
USPC .......................................... 60/624; 415/119
See application file for complete search history.

(56) References Cited

U.S. PATENT DOCUMENTS 856,208 A 6/1907 Backstrom
1,069,177 A 8/1913 Rearick
(Continued)

FOREIGN PATENT DOCUMENTS

DE 102005011482 9/2006
GB 226532 3/1925
WO 2013153052 10/2013

*Primary Examiner* — Mark Laurenzi
*Assistant Examiner* — Dapinder Singh
(74) *Attorney, Agent, or Firm* — Norton Rose Fulbright Canada

(57) ABSTRACT

An inlet guide assembly for a turbine receiving a pulsed flow, including a duct having an internal volume, and an inlet port, first outlet nozzle and second outlet nozzle each communicating with the internal volume. The inlet port is configured to receive at least part of the pulsed flow. The first and second outlet nozzles each define a respective nozzle area communicating between the internal volume and a flow path of the turbine. The first and second outlet nozzles are spaced from one another with the first outlet nozzle located closer to the inlet port than the second outlet nozzle relative to a flow direction through the duct, the nozzle area of the first outlet nozzle being smaller than the nozzle area of the second outlet nozzle. A compound engine assembly and method of introducing a pulsed flow into a flow path of a turbine are also discussed.

24 Claims, 9 Drawing Sheets

(56) References Cited

U.S. PATENT DOCUMENTS

| | | |
|---|---|---|
| 1,534,721 A | 4/1925 | Lasche |
| 3,006,603 A | 10/1961 | Caruso et al. |
| 3,873,231 A * | 3/1975 | Callahan .................. D21F 1/00 415/119 |
| 4,253,800 A * | 3/1981 | Segawa ..................... F01D 5/10 415/119 |
| 7,694,518 B2 | 4/2010 | Whiting et al. |
| 7,845,900 B2 | 12/2010 | Roduner et al. |
| 2009/0136338 A1 | 5/2009 | Laubender et al. |
| 2014/0234094 A1 | 8/2014 | Eckert |
| 2015/0275749 A1 | 10/2015 | Thomassin |

* cited by examiner

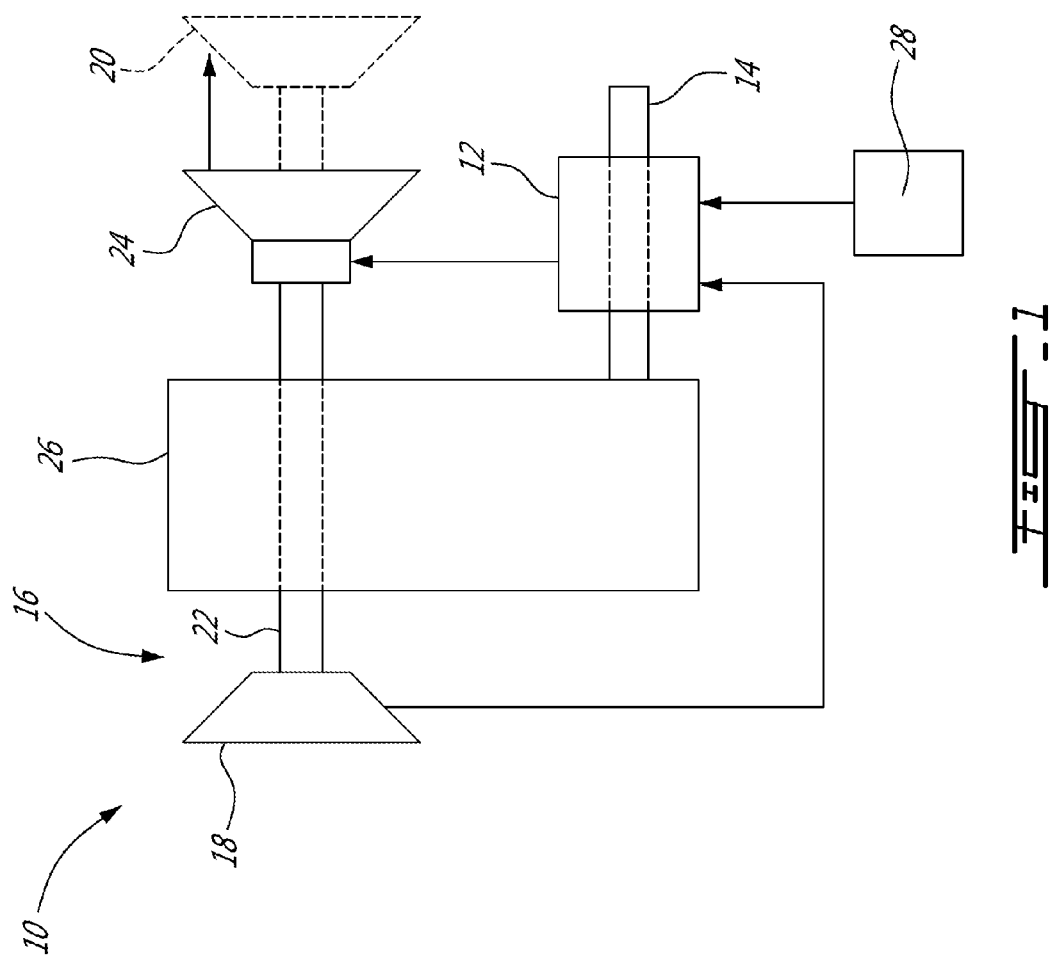

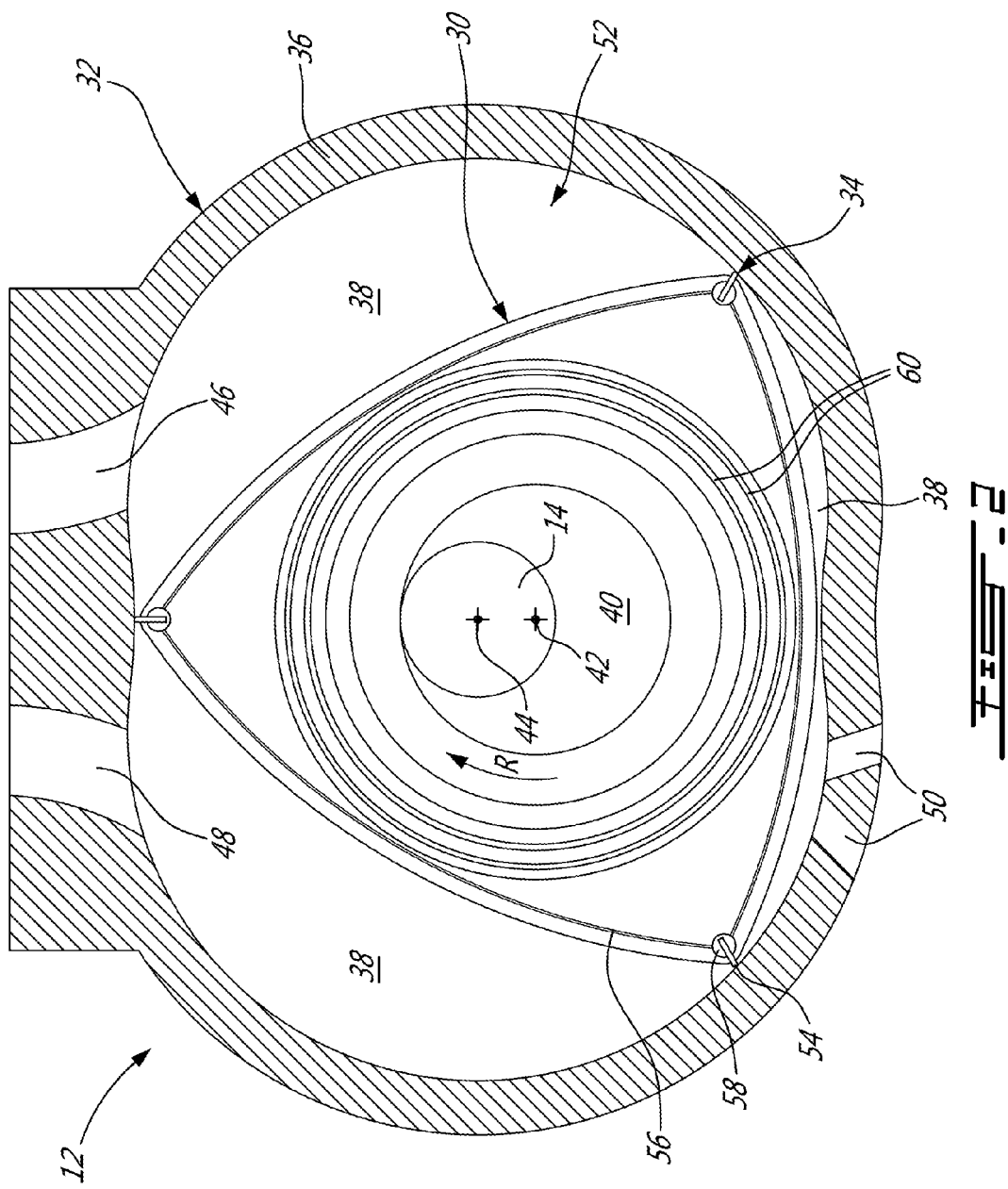

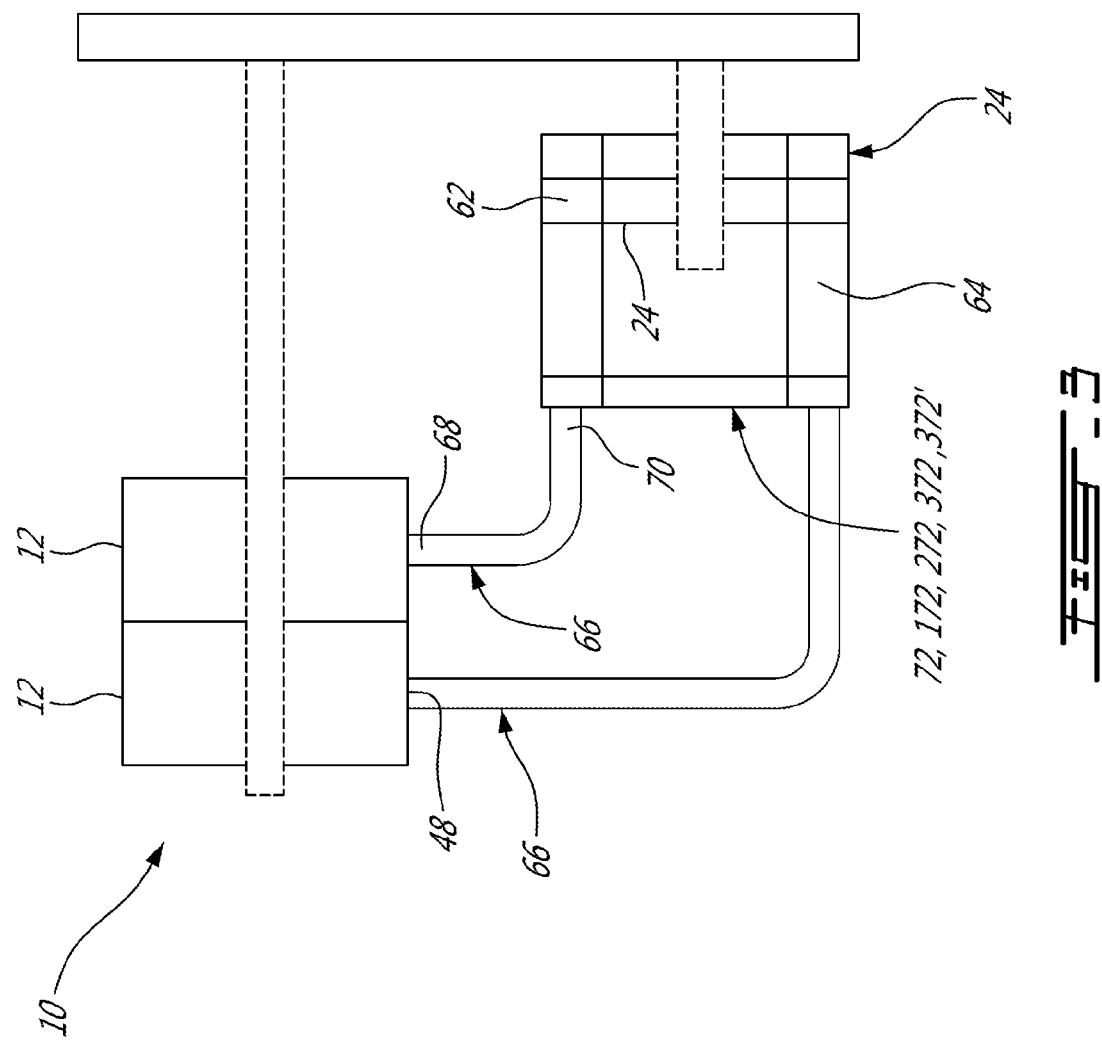

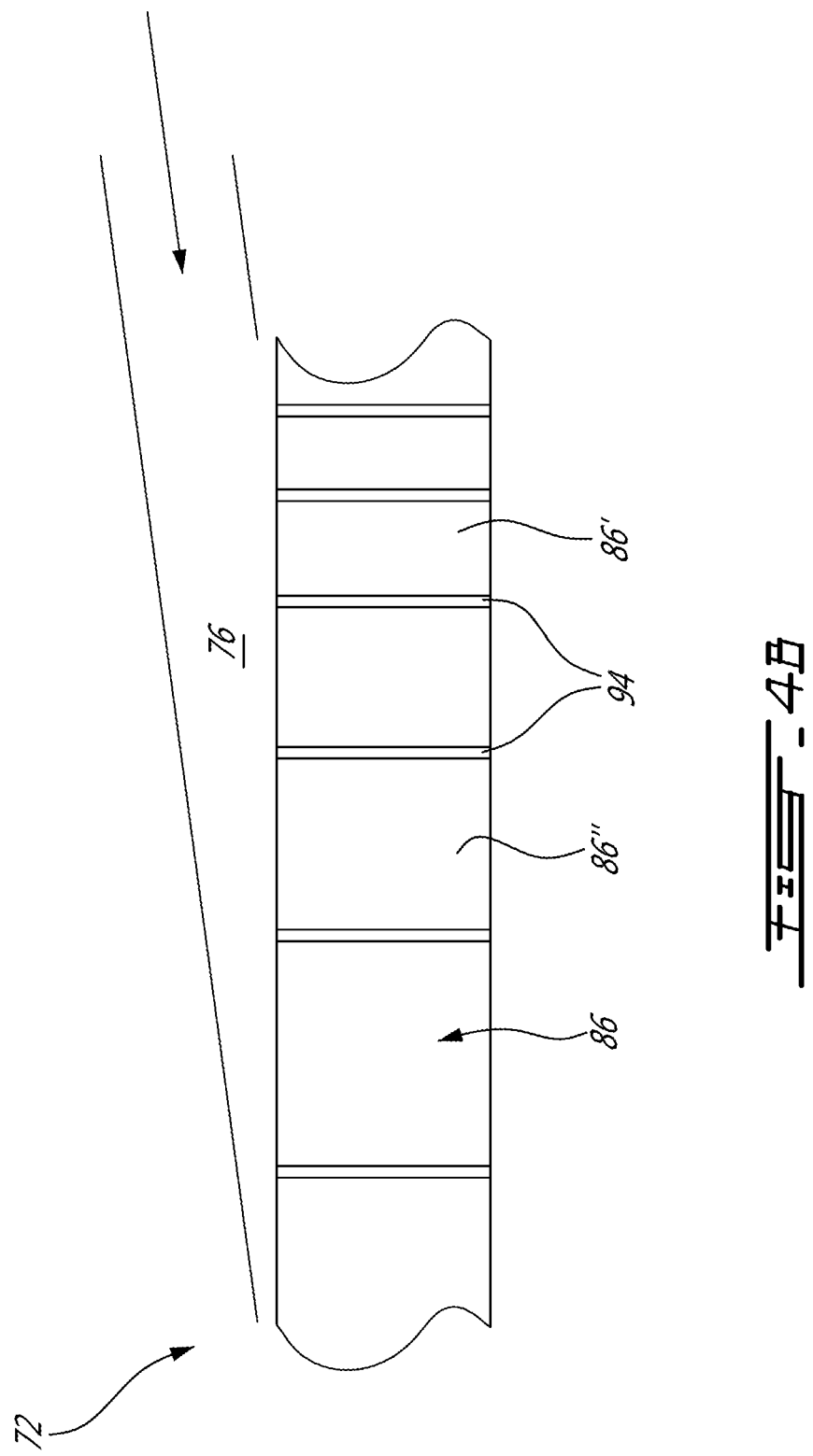

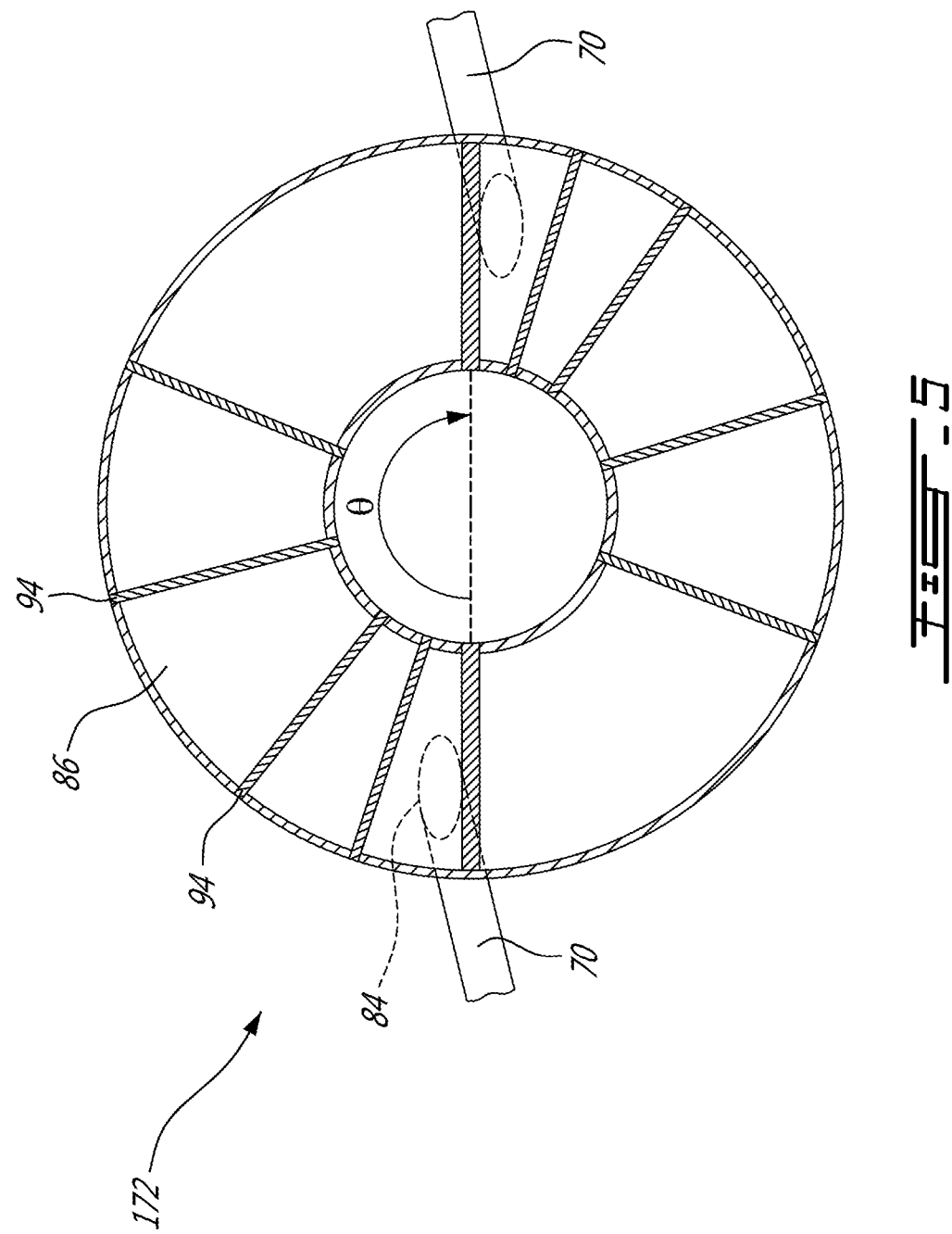

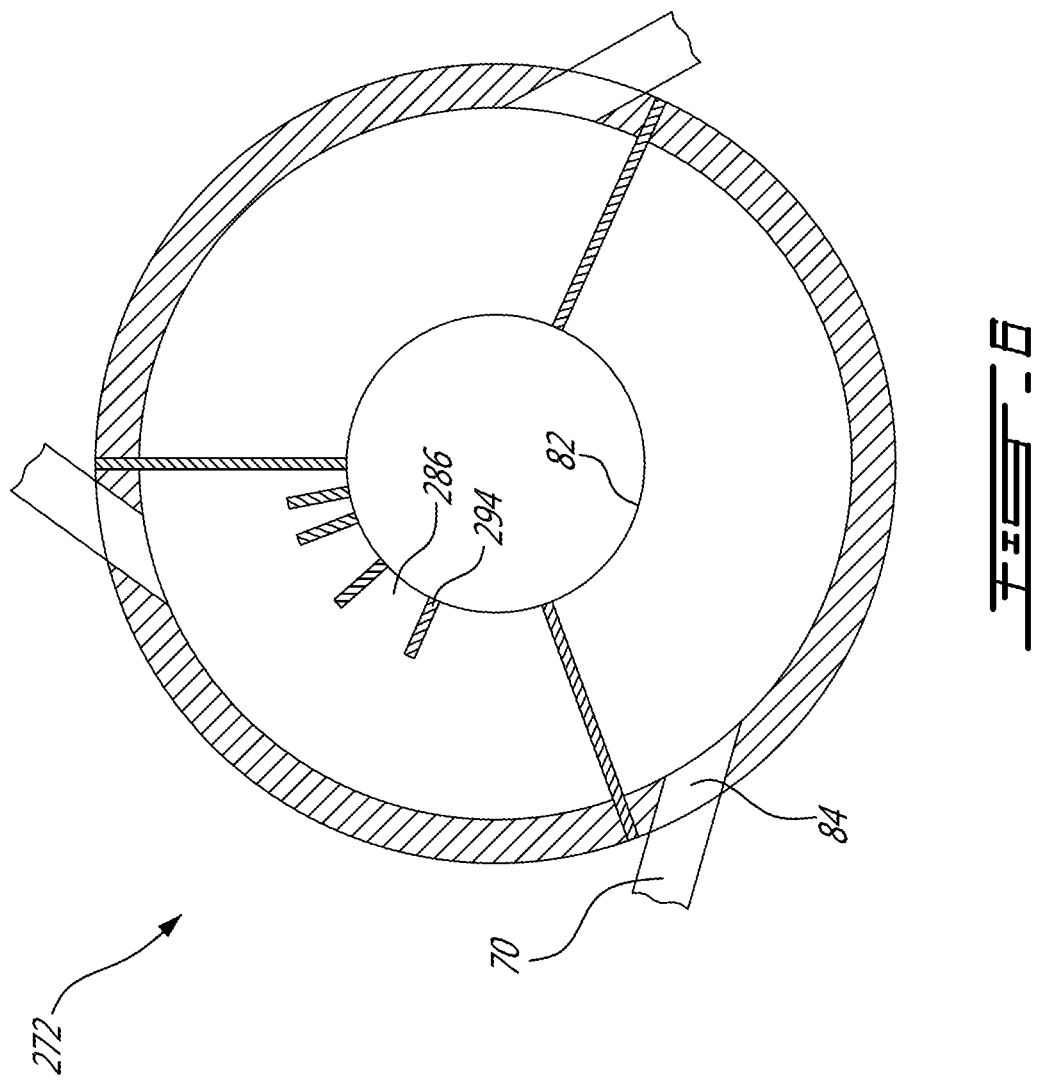

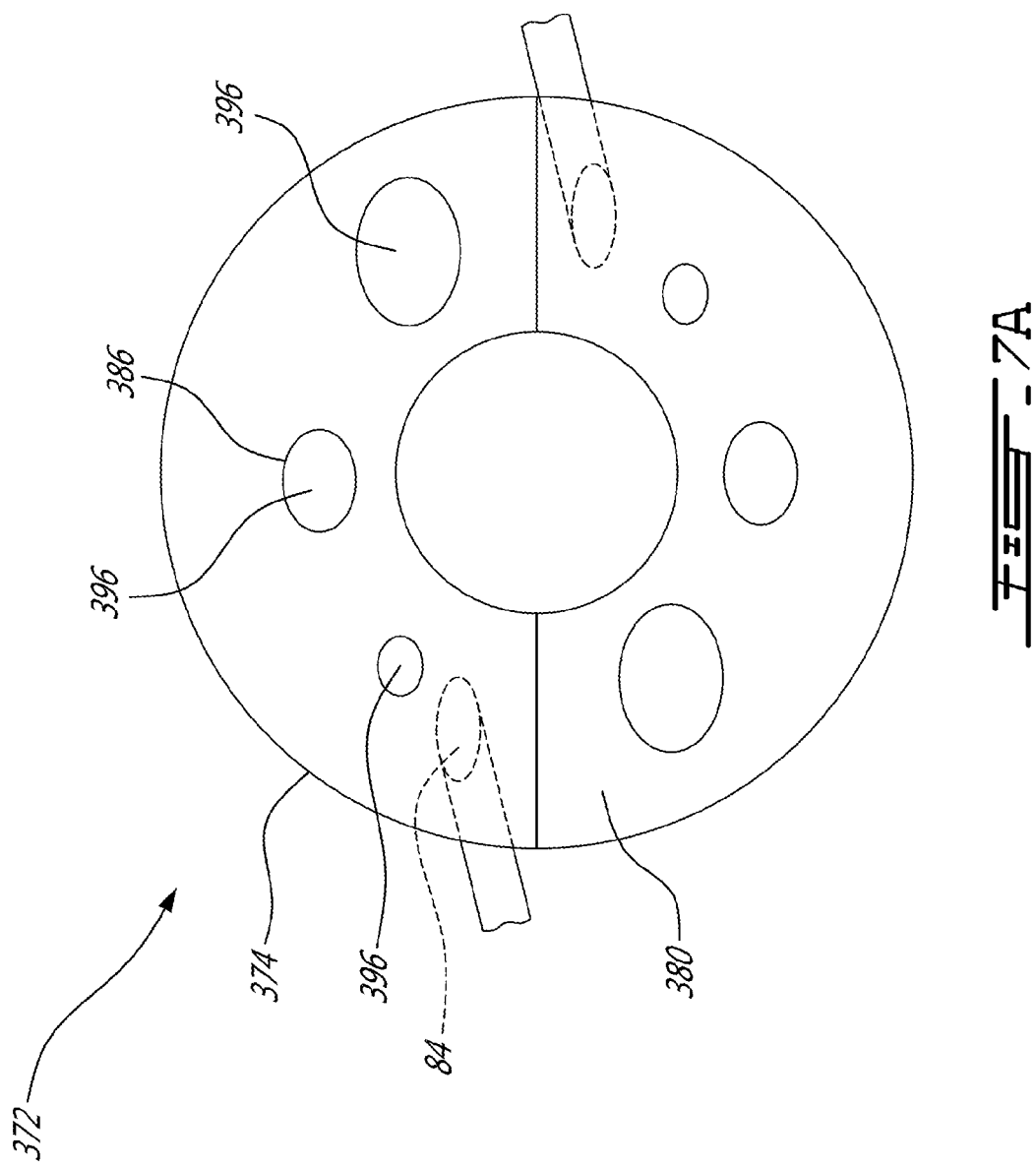

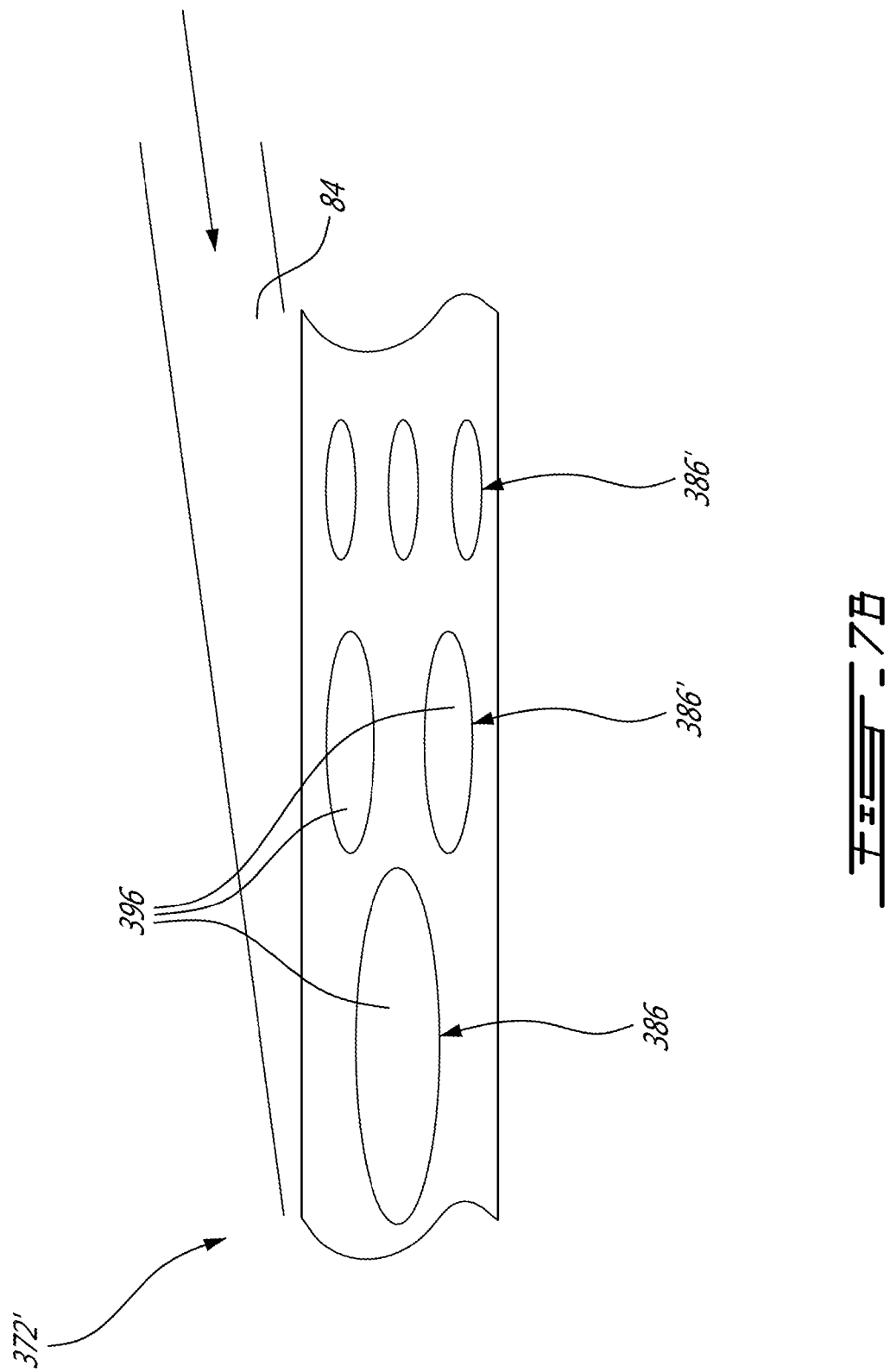

US 9,890,649 B2

INLET GUIDE ASSEMBLY

TECHNICAL FIELD

The application relates generally to compound engine assemblies and, more particularly, to turbine inlet guide assemblies for such engines.

BACKGROUND OF THE ART

Compound engine assemblies including an impulse turbine with a reciprocating engine core are known and typically include exhaust pipes defining a nozzle at their end for communication with a flow path of the impulse turbine. However, each nozzle delivers the exhaust over a respective arc of the flow path, and flow velocity tends to drop along the respective arc, which may lead to inefficient use of the exhaust pulse energy within the turbine.

SUMMARY

In one aspect, there is provided an inlet guide assembly for a turbine receiving a pulsed flow, the inlet guide assembly comprising a duct having an internal volume, and an inlet port, first outlet nozzle and second outlet nozzle each communicating with the internal volume, the inlet port configured to receive at least part of the pulsed flow, the first and second outlet nozzles each defining a respective nozzle area communicating between the internal volume and a flow path of the turbine, the first and second outlet nozzles spaced from one another with the first outlet nozzle located closer to the inlet port than the second outlet nozzle relative to a flow direction through the duct, the nozzle area of the first outlet nozzle being smaller than the nozzle area of the second outlet nozzle.

In another aspect, there is provided a compound engine assembly comprising: an engine core including at least one internal combustion engine having at least one exhaust port configured to provide a pulsed flow; a turbine having a circumferential array of rotor blades adapted to rotate in a flow path; an exhaust pipe for each exhaust port, each exhaust pipe having a first end in fluid communication with the exhaust port and an opposed second end; and a duct defining a respective internal volume for each exhaust pipe, the duct including for each respective internal volume an inlet port providing a communication between the respective internal volume and the second end of the exhaust pipe and a plurality of circumferentially spaced nozzles each having a nozzle area providing a communication between the respective internal volume and the flow path of the turbine; wherein the plurality of nozzles of each respective internal volume includes a first nozzle located at a first distance from the inlet port of the respective internal volume and a second nozzle located at a second distance from the inlet port of the respective internal volume, the first and second distances measured along a circumferential direction of the duct with the first distance being smaller than the second distance, the nozzle area of the first nozzle being smaller than the nozzle area of the second nozzle.

In another aspect, there is provided an inlet guide assembly for a turbine receiving a pulsed flow, the inlet guide assembly comprising a duct having an internal volume and an inlet port and a plurality of nozzles communicating with the internal volume, the inlet port configured to receive the pulsed flow, the plurality of nozzles each defining a respective nozzle area communicating between the internal volume and a flow path of the turbine, the nozzles arranged serially and spaced-apart along a direction of flow through the duct, at least one of the nozzles having a greater nozzle area than at least another one of the nozzles located upstream therefrom.

In a further aspect, there is provided a method of introducing a pulsed flow into a flow path of a turbine, the method comprising: providing a plurality of circumferentially spaced nozzles in communication with the flow path of the turbine, the nozzles defining a greater restriction to the pulsed flow in a first location than in a second location along a circumferential direction of the nozzles; and directing the pulsed flow along a circumferential path to the first location and then to the second location so that the first location is upstream of the second location, while circulating the flow through the plurality of circumferentially spaced nozzles to the flow path of the turbine.

DESCRIPTION OF THE DRAWINGS

Reference is now made to the accompanying figures in which:

FIG. 1 is a schematic representation of a compound engine assembly according to a particular embodiment;

FIG. 2 is a cross-sectional view of a Wankel engine which can be used in a compound engine assembly such as shown in FIG. 1, according to a particular embodiment;

FIG. 3 is a schematic representation of part of the compound engine assembly of FIG. 1 according to a particular embodiment;

FIG. 4B is a schematic, flattened view of part of the inlet guide assembly of FIG. 4A;

FIG. 5 is a schematic front cross-sectional view of an inlet guide assembly according to another particular embodiment;

FIG. 6 is a schematic front cross-sectional view of an inlet guide assembly according to another particular embodiment;

FIG. 7A is a schematic front view of an inlet guide assembly according to another particular embodiment; and FIG. 7B is a schematic, flattened view of part of an inlet guide assembly according to another particular embodiment.

DETAILED DESCRIPTION

Figure 4A:
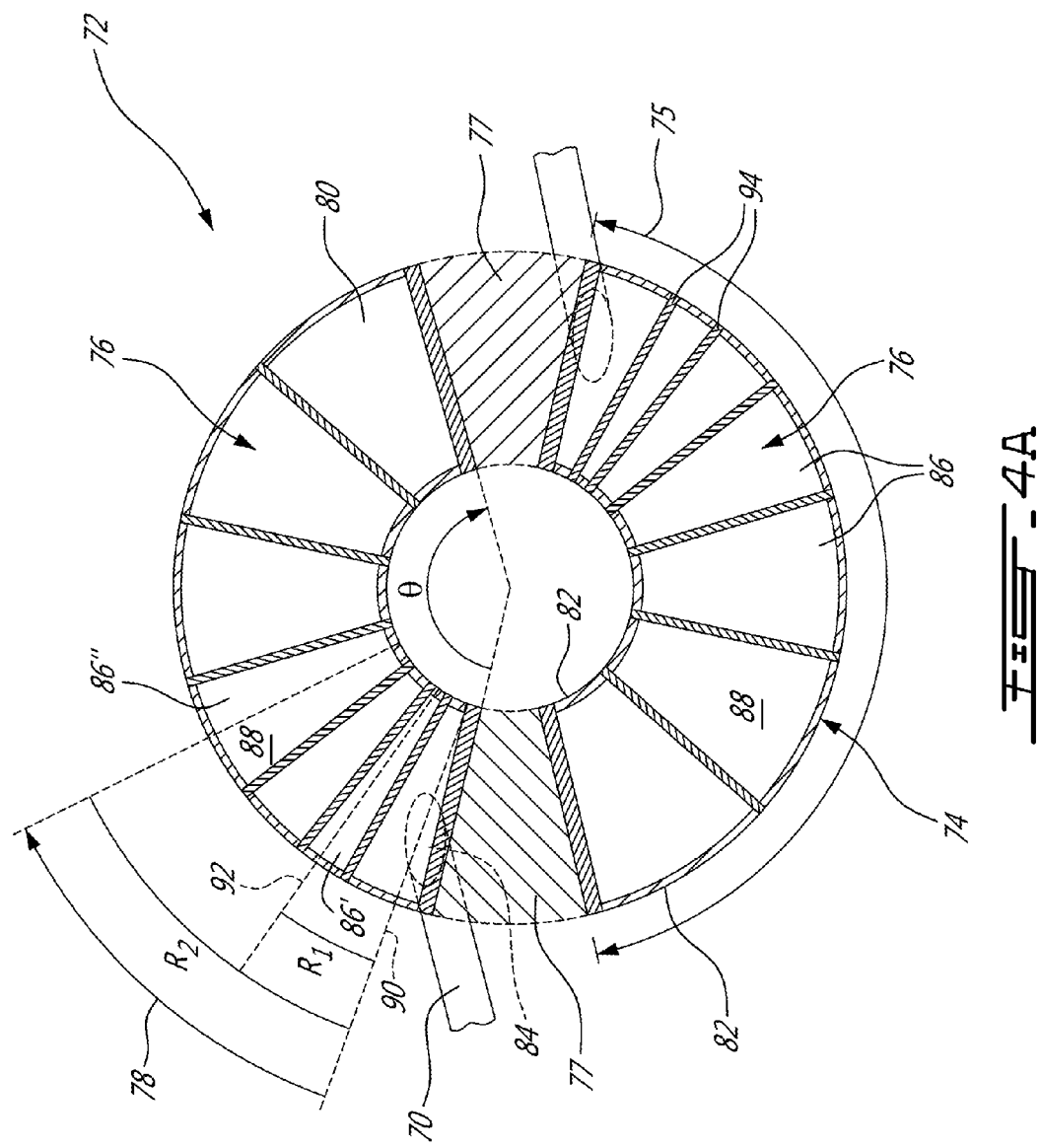
FIG. 4A is a schematic front cross-sectional view of an inlet guide assembly according to a particular embodiment.

Referring to FIG. 1, a compound engine assembly 10 is schematically shown. The compound engine assembly 10 includes an engine core with one or more intermittent combustion internal combustion engine(s) 12. The internal combustion engine(s) 12 drive a common load. In the embodiment shown, the common load includes an output shaft 14 which may be for example connected to a propeller through a reduction gearbox (not shown) and to which each internal engine is engaged. Other possible common loads may include, but are not limited to, one or more compressor and/or fan rotor(s), electrical generator(s), accessories, rotor mast(s), or any other type of load or combination thereof.

In a particular embodiment, the compound engine assembly 10 also includes a turbocharger 16, including a compressor 18 and a second stage turbine 20 which are drivingly interconnected by a shaft 22. The compressor 18 and the second stage turbine 20 may each be a single-stage device or a multiple-stage device with a single shaft or split on multiple independent shafts in parallel or in series, and may each be a centrifugal or axial device. The compressor 18 of the turbocharger 16 compresses the air before it enters the core engine(s) 12. The compressor 18 and the second stage turbine 20 may each include one or more rotors, with radial, axial or mixed flow blades.

In the embodiment shown, the shaft 22 of the turbocharger 16 extends along a different axis than that of the output shaft 14, for example parallel thereto; alternately, the shaft 22 of the turbocharger may extend transverse to the output shaft 14, or may be defined coaxially with the output shaft 14. The turbocharger shaft 22 and output shaft 14 are in driving engagement with one another, through any suitable type of transmission or gearbox 26, for example a planetary, star, offset or angular gear system.

Alternately, the turbocharger 16 may be omitted.

Each internal combustion engine 12 provides an exhaust flow in the form of exhaust pulses or pulsed flow, caused by the intermittent combustion occurring with the intermittent combustion internal combustion engine 12. The exhaust flow of the internal combustion engine 12 is supplied to a compound or first stage turbine 24 in fluid communication therewith. The first stage turbine 24 could be an axial, radial or mixed flow turbine. In the embodiment shown, the first stage turbine 24 is drivingly interconnected to the second stage turbine 20 by being mounted to the same turbine shaft 22, and accordingly also drivingly engaged to the output shaft 14 through the gearbox 26. In an alternate embodiment, the turbines 24, 20 may rotate independently, with the first stage turbine 24 drivingly engaged to the output shaft 14, for example via the gearbox 26, and the second stage turbine 26 drivingly engaged to the compressor 18, for example via the turbine shaft 22.

The outlet of the first stage turbine 24 is in fluid communication with an inlet of the second stage turbine 20. Energy is extracted from the exhaust gas exiting the first stage turbine 24 by the second stage turbine 20 to drive the compressor 18 via the connecting shaft 22. In a particular embodiment, the second stage turbine 20 is a pressure turbine, also known as a reaction turbine, and the first stage turbine 24 is configured as a velocity type turbine, also known as an impulse turbine.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due to the acceleration and turning of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \tag{1}$$

$$\text{Reaction}(P) = \frac{(P_{S3} - P_{S5})}{(P_{S0} - P_{S5})} \tag{2}$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

Aeronautical turbines referred to as impulse turbines typically have a reaction ration of 0.25 (25% reaction) or lower, although other values are also possible.

In a particular embodiment, the first stage turbine 24 is configured to take benefit of the kinetic energy of the pulsating flow exiting the internal combustion engine(s) 12 while stabilizing the flow, and the second stage turbine 20 is configured to extract energy from the remaining pressure in the flow. Accordingly, the first stage turbine 24 has a lower (i.e. lower value) reaction ratio than that of the second stage turbine 20.

In a particular embodiment, the second stage turbine 20 has a reaction ratio higher than 0.25; in another particular embodiment, the second stage turbine 20 has a reaction ratio higher than 0.3; in another particular embodiment, the second stage turbine 20 has a reaction ratio of about 0.5; in another particular embodiment, the second stage turbine 20 has a reaction ratio higher than 0.5.

In a particular embodiment, the first stage turbine 24 has a reaction ratio of at most 0.2; in another particular embodiment, the first stage turbine 24 has a reaction ratio of at most 0.15; in another particular embodiment, the first stage turbine 24 has a reaction ratio of at most 0.1; in another particular embodiment, the first stage turbine 24 has a reaction ratio of at most 0.05.

It is understood that any of the above-mentioned reaction ratios for the second stage turbine 20 can be combined with any of the above-mentioned reaction ratios for the first stage turbine 24 and that these ratios can be pressure-based or temperature-based. Other values are also possible.

Although not shown, the air may optionally circulate through an intercooler between the compressor 18 and the internal combustion engine(s) 12, and the engine assembly 10 also includes a cooling system, including for example a circulation system for a coolant (e.g. water-ethylene, oil, air) to cool the housing of each internal combustion engine 12, an oil coolant for the internal mechanical parts of the internal combustion engine(s) 12, one or more coolant heat exchangers, etc.

The fuel injector(s) of each internal combustion engine 12, which in a particular embodiment are common rail fuel injectors, communicate with a source 28 of Heavy fuel (e.g. diesel, kerosene (jet fuel), equivalent biofuel), and deliver the heavy fuel into the internal combustion engine(s) 12 such that the combustion chamber is stratified with a rich fuel-air mixture near the ignition source and a leaner mixture elsewhere.

In a particular embodiment, each internal combustion engine 12 is a rotary internal combustion engine having a rotor sealingly engaged in a respective housing. In a particular embodiment, the rotary engine(s) is/are Wankel engine(s). Referring to FIG. 2, an exemplary embodiment of a Wankel engine is shown; it is understood that the configuration of the internal combustion engine(s) 12 used in the compound engine assembly 10, e.g. placement of ports, number and placement of seals, etc., may vary from that of the embodiment shown. In addition, it is understood that each internal combustion engine 12 may be of any other type including, but not limited to, any other type of rotary engine.

As shown in FIG. 2, each Wankel engine comprises a housing 32 defining an internal cavity with a profile defining two lobes, which is preferably an epitrochoid. A rotor 30 is received within the internal cavity. The rotor 30 defines three circumferentially-spaced apex portions 34, and a generally triangular profile with outwardly arched sides. The apex portions 34 are in sealing engagement with the inner surface of a peripheral wall 36 of the housing 32 to form three working chambers 38 between the rotor 30 and the housing 32.

The rotor 30 is engaged to an eccentric portion 40 of the output shaft 14 to perform orbital revolutions within the internal cavity. The output shaft 14 performs three rotations for each orbital revolution of the rotor 30. The geometrical axis 42 of the rotor 30 is offset from and parallel to the axis 44 of the housing 32. During each orbital revolution, each chamber 38 varies in volume and moves around the internal cavity to undergo the four phases of intake, compression, expansion and exhaust.

An intake port 46 is provided through the peripheral wall 36 for successively admitting compressed air into each working chamber 38. An exhaust port 48 is also provided through the peripheral wall 36 for successively discharging the exhaust gases from each working chamber 38. Passages 50 for a glow plug, spark plug or other ignition element, as well as for one or more fuel injectors (not shown) are also provided through the peripheral wall 36. Alternately, the intake port 46, the exhaust port 48 and/or the passages 50 may be provided through an end or side wall of the housing 32; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 36.

For efficient operation the working chambers 38 are sealed, for example by spring-loaded apex seals 54 extending from the rotor 30 to engage the peripheral wall 36, and spring-loaded face or gas seals 56 and end or corner seals 58 extending from the rotor 30 to engage the end walls. The rotor 30 also includes at least one spring-loaded oil seal ring 60 biased against the end wall around the bearing for the rotor 30 on the shaft eccentric portion 40.

Each Wankel engine provides an exhaust flow in the form of a relatively long exhaust pulse through the exhaust port 48; for example, in a particular embodiment, each Wankel engine has one explosion per 360° of rotation of the output shaft, with the exhaust port remaining open for about 270° of that rotation, thus providing for a pulse duty cycle of about 75%. By contrast, a piston of a reciprocating 4-stroke piston engine typically has one explosion per 720° of rotation of the output shaft with the exhaust port remaining open for about 180° of that rotation, thus providing a pulse duty cycle of 25%.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine 24 may be maximized by having the exhaust gas temperatures at the material limit, and as such is suitable for such relatively low volumetric compression ratios, which may help increase the power density of the Wankel engine and may also improve combustion at high speed and of heavy fuel.

Referring to FIG. 3, in a particular embodiment, the compound engine assembly 10 includes two (2) internal combustion engines 12 in the form of Wankel engines, for example such as shown in FIG. 2. In other embodiments, more or less internal combustion engines may be provided; for example, in another particular embodiment, the engine core includes four (4) Wankel engines, or any suitable number of internal combustion engines having any other suitable configuration (e.g. reciprocating engine defining one exhaust port per piston).

In the embodiment shown, the first stage turbine 24 includes a circumferential array of rotor blades 62 adapted to rotate in an annular flow path 64. In the embodiment shown, the turbine is an axial turbine, and the flow path 64 extends along an axial direction relative to an axis of rotation of the first stage turbine 24. Alternately, the first stage turbine 24 may be a radial turbine, for example with an upstream part of the flow path extending along a radial direction.

The compound engine assembly 10 includes an exhaust pipe 66 for each exhaust port 48. Each exhaust pipe 66 includes a first end 68 in fluid communication with the exhaust port 48 of the respective internal combustion engine 12 and an opposed second end 70 in fluid communication with an inlet guide assembly 72, 172, 272, 372, 372' of the first stage turbine 24, which communicates with the flow path 64 upstream of the rotor blades 62. The inlet guide assembly 72, 172, 272, 372, 372' thus receives the pulsed flow from the exhaust pipe(s) 66 and directs the pulsed flow into the flow path 64.

In a particular embodiment, a cross-sectional area of the exhaust pipe(s) 66 upstream of the second end 70 is constant, and this constant cross-sectional area corresponds to that of the engine exhaust port 48 connected to the exhaust pipe 66. Alternately, the exhaust pipe 66 may have a different cross-sectional area than that of the exhaust port 48, and may be for example smaller than that of the corresponding exhaust port 48.

Referring to FIGS. 4A-4B, the inlet guide assembly 72 according to a particular embodiment is shown. The inlet guide assembly 72 includes an arcuately-shaped duct 74 defining one or more internal volume(s) 76. The duct 74 can be any structure adapted to receive and direct the pulsed flow therein along a circumferential direction 78. The duct 74 has axially spaced end faces 80 (only one end face is shown) interconnected by concentric radially spaced faces 82 for receiving and directing the pulsed flow within the duct 74. In a particular embodiment, the duct 74 is an annular duct. The duct 74 may have a circular or semi-circular cross-section, such that some or all of the faces 80, 82 may be defined by a common wall.

Each internal volume 76 is defined as a portion of the inner volume between the axially spaced end faces 80 and the radially spaced faces 82 of the duct 74. In the embodiment shown, the duct 74 includes two interconnected internal volumes 76. Each of these two internal volumes 76 defines a section of the duct 74. In a particular embodiment, each section expands over an arc covering an angle θ approximately 120° of the circumference of the duct 74. The internal volumes 76 are separated from one another by any suitable type of partition 77, which may include a solid wall, spaced apart walls enclosing a cavity or other structure of the engine, or spaced apart, separate walls.

Although the internal volumes 76 are shown as together extending around only part of a complete circumference, alternately the internal volumes 76 may together extend around a complete circumference of the duct 74 (e.g., two internal volumes extending around approximately 180° each as shown for example by the assembly 172 of FIG. 5, three internal volumes extending around approximately 120° each). Moreover, the internal volumes 76 may together extend around only part of the circumference with different angular values than that shown (e.g. two or three internal volumes extending around approximately 90° each). Other values are of course possible. The duct 74 may be provided as a single structure or in separate sections each containing one of the internal volumes 76; such sections can abut one another and be interconnected, or be circumferentially spaced from one another when the internal volumes together extend around only part of a complete circumference.

Each internal volume 76 includes an inlet port 84 configured to engage the second end 70 of the respective exhaust pipe 66 receiving the pulsed flow. The inlet port 84 fluidly communicates with the respective internal volume 76.

In addition, each internal volume 76 includes circumferentially spaced outlet nozzles 86 arranged along an admission arc 75 and configured to communicate with the flow path 64 of the first stage turbine 24. The nozzles 86 also fluidly communicates with the respective internal volume 76 and are located upstream of the turbine blades 62. In the embodiment shown, the inlet guide assembly 72 is configured for use with an axial turbine and accordingly the nozzles 86 are located on one of the end faces 80 to discharge the pulsed flow along an axial direction of the duct 74.

The nozzles 86 are circumferentially distributed around the duct 74. Each nozzle 86 is located at a circumferential distance or arc length from the inlet port 84, measured along the circumferential direction 78 of the duct 74; the distance is thus defined along the arc extending between a centerline 90 of the inlet port 84 to a centerline 92 of each nozzle 86.

Each nozzle 86 also defines a nozzle area 88 (open cross-sectional area) for providing the communication between the respective internal volume 76 and the turbine flow path 64. In the embodiment shown, a nozzle 86' located at a distance R1 from the inlet port 84 has a nozzle area 88 which is smaller than that of a nozzle 86" located at a greater distance R2 from the inlet port 84. In other words, the nozzle 86' located closer to the inlet port 84 (upstream relative to the flow direction through the duct 74) has a smaller nozzle area 88. Therefore, the nozzles 86 define a greater restriction to the pulsed flow through the first nozzle 86' closer to the inlet port 84 compared to through the second nozzle 86" further away or downstream thereof.

In a particular embodiment, the pulsed flow circulating in the duct 74 is supersonic. An increase in nozzle area 88 as flow travels away from the inlet port 84 is thus desirable to increase the flow velocity of the pulsed flow since the pressure of the pulsed flow propagating through the duct 74 can be reduced over the arc of the internal volume 76 along the circumferential direction 78. The increase in nozzle area of the nozzles 86 located further away from the inlet port 84 allows for a greater increase in flow velocity through such nozzles 86 as compared to the nozzles closer to the inlet port 84, which in a particular embodiment allows to obtain a substantially constant flow velocity across the arc of the nozzles 86 within each internal volume 76.

In a particular embodiment, the nozzle area 88 of each nozzle 86 located at a given distance from the inlet port 84 is at least equal to that of the nozzle areas of the nozzles 86 located closer to the inlet port 84. The increase in the nozzle area 88 can be progressive or discrete as the distance R from the inlet port 84 increases. In the case of the discrete increase, adjacent nozzles 86 can have the same nozzle area 88. For example, a first group of the nozzles 86 closer to the inlet port 84 can have a first nozzle area that is smaller than a second nozzle area of a second group of nozzles 86 further away from the inlet port 84. Alternately, each nozzle 86 may have a greater nozzle area than that of the nozzles located closer to the inlet port 84.

In the particular embodiment shown, each nozzle 86 is defined between adjacent pairs of circumferentially spaced vanes 94 spanning the open end face 80. The vanes 94 may have any appropriate type of airfoil profile. The nozzle area 88 of the nozzles 86 is varied by varying an inter-vane spacing or circumferential distance between the adjacent vanes. The inter-vane spacing or circumferential distance between the adjacent vanes 94 thus increases as the vanes 94 are located further away from the inlet port 84. The inter-vane spacing may progressively increase as the distance from the inlet port increases (as shown in FIGS. 4A-4B) or alternately, increase in groups (as shown in FIG. 5). For example, a first group of nozzles may be defined by a first group of identically spaced vanes, and a second group of nozzles be defined by a second group of identically spaced vanes, with the vanes of the group closer to the inlet port 84 having a smaller inter-vane spacing.

Referring to FIG. 6, an inlet guide assembly 272 according to another particular embodiment is shown. The inlet guide assembly 272 of FIG. 6 is similar to the inlet guide assembly 72 of FIG. 4, except that it is configured for use with a radial turbine; the end faces 80 are closed and the nozzles 286 span an inner one of the radially spaced faces 82 which is open, to discharge the pulsed flow along a radial direction of the duct 74. The nozzles 286 are also defined between adjacent vanes of a circumferential array of vanes 294. As in the embodiment of FIG. 4, a smaller circumferential distance is defined between adjacent ones of the vanes 294 located closer to the inlet port 84 than that between adjacent ones of the vanes located further away from the inlet port 84.

Referring to FIGS. 7A-7B, inlet guide assemblies 372, 372' according to another particular embodiment is shown, suitable for use with an axial turbine. In these embodiments, the nozzles 386, 386' are defined by spaced apart apertures 396 formed through one of the end faces 380 of the duct 374. The apertures 396 can have any suitable shape. For example, as shown in FIG. 7B, the apertures 396 have an elliptical shape, slanted with respect to the flow. Each nozzle may be defined by a single aperture (FIG. 7A), or by a plurality of apertures with the nozzle area corresponding to the sum of the cross-sectional area of its apertures (FIG. 7B for nozzles 386'). The nozzles may be equally spaced apart along the direction of flow.

Accordingly, in a particular embodiment, the inlet guide assembly 72, 172, 272, 372, 372' is used for introducing the pulsed flow into a flow path 64 of the first stage turbine 24 by directing the pulsed flow into one or more internal volume(s) 76 of the duct 74 through the respective inlet of the duct 74, directing the pulsed flow circumferentially along each internal volume 76, and finally directing the pulsed flow from each internal volume 76 to the flow path 64 through the circumferentially spaced nozzles 86 of the duct 74.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An inlet guide assembly for a turbine receiving a pulsed flow, the inlet guide assembly comprising a duct having an internal volume, and an inlet port, first outlet nozzle and second outlet nozzle each communicating with the internal volume, the inlet port configured to receive at least part of the pulsed flow, the first and second outlet nozzles each defining a respective nozzle area communicating between the internal volume and a flow path of the turbine, the first and second outlet nozzles spaced from one another with the first outlet nozzle located closer to the inlet port than the second outlet nozzle relative to a flow direction through the duct, the nozzle area of the first outlet nozzle being smaller than the nozzle area of the second outlet nozzle.

2. The inlet guide as defined in claim 1, further comprising a third outlet nozzle communicating with the internal volume, the third outlet nozzle located further from the inlet port than the second outlet nozzle relative to the flow direction, a nozzle area of the third outlet nozzle being greater than the nozzle area of the second outlet nozzle.

3. The inlet guide as defined in claim 2, wherein a spacing along the flow direction between the first and second outlet nozzles is the same as a spacing along the flow direction between the second and third outlet nozzles.

4. The inlet guide as defined in claim 1, wherein the first outlet nozzle is part of a group of first outlet nozzles each having the same nozzle area, the first group located closer to the inlet port than the second outlet nozzle relative to the flow direction.

5. The inlet guide as defined in claim 1, wherein the second outlet nozzle is part of a group of second outlet nozzles each having the same nozzle area, the first outlet nozzle located closer to the inlet port than the second group relative to the flow direction.

6. The inlet guide as defined in claim 1, wherein the first outlet nozzle is part of a group of first equally spaced apart outlet nozzles each having the same nozzle area, the second outlet nozzle is part of a group of equally spaced apart second outlet nozzles each having the same nozzle area, the first group located closer to the inlet port than the second group relative to the flow direction.

7. The inlet guide as defined in claim 6, wherein each outlet nozzle of the first group is defined between first adjacent ones of a plurality of vanes having a first circumferential inter-vane spacing, each outlet nozzle of the second group is defined between second adjacent ones of the plurality of vanes having a second circumferential inter-vane spacing, the first inter-vane spacing smaller than the second inter-vane spacing.

8. The inlet guide as defined in claim 1, wherein the first outlet nozzle is defined by a plurality of first apertures formed through a face of the duct, the nozzle area of the first outlet nozzle is a sum of the cross-sectional area of the first apertures.

9. The inlet guide as defined in claim 8, wherein the second outlet nozzle is defined by a single second aperture formed through the face of the duct.

10. The inlet guide as defined in claim 1, wherein the assembly includes a plurality of outlet nozzles including the first outlet nozzle, the second outlet nozzle, and additional outlet nozzles, the nozzle area of the plurality of outlet nozzles progressively increasing as a distance from the inlet port along the flow direction increases.

11. The inlet guide as defined in claim 1, wherein each outlet nozzle is defined between adjacent ones of a plurality of circumferentially unevenly spaced vanes.

12. The inlet guide as defined in claim 1, wherein the duct includes an additional internal volume and an additional inlet port communicating with the additional internal volume, a third outlet nozzle and a fourth outlet nozzle communicating with the additional internal volume, the additional inlet port configured to receive another part of the pulsed flow, the third and fourth outlet nozzles each defining a respective nozzle area communicating between the additional internal volume and the flow path of the turbine, the third and fourth outlet nozzles spaced from one another with the third outlet nozzle located closer to the inlet port than the fourth outlet nozzle relative to the flow direction through the duct, the nozzle area of the third outlet nozzle being smaller than the nozzle area of the fourth outlet nozzle.

13. A compound engine assembly comprising:
   an engine core including at least one internal combustion engine having at least one exhaust port configured to provide a pulsed flow;
   a turbine having a circumferential array of rotor blades adapted to rotate in a flow path;
   an exhaust pipe for each exhaust port, each exhaust pipe having a first end in fluid communication with the exhaust port and an opposed second end; and
   a duct defining a respective internal volume for each exhaust pipe, the duct including for each respective internal volume an inlet port providing a communication between the respective internal volume and the second end of the exhaust pipe and a plurality of circumferentially spaced nozzles each having a nozzle area providing a communication between the respective internal volume and the flow path of the turbine;
   wherein the plurality of nozzles of each respective internal volume includes a first nozzle located at a first distance from the inlet port of the respective internal volume and a second nozzle located at a second distance from the inlet port of the respective internal volume, the first and second distances measured along a circumferential direction of the duct with the first distance being smaller than the second distance, the nozzle area of the first nozzle being smaller than the nozzle area of the second nozzle.

14. The compound engine assembly as defined in claim 13, wherein the at least one internal combustion engine includes at least one rotary engine each including a rotor sealingly and rotationally received within an internal cavity to provide rotating chambers of variable volume in the internal cavity, the rotor having three apex portions separating the rotating chambers and mounted for eccentric revolutions within the internal cavity, the internal cavity having an epitrochoid shape with two lobes, each of the at least one exhaust port communicating with the internal cavity of a respective one of the at least one Wankel engine.

15. The compound engine assembly as defined in claim 13, wherein the plurality of nozzles are configured to discharge the pulsed flow along an axial direction of the duct.

16. The compound engine assembly as defined in claim 13, wherein the nozzle area of each nozzle is greater than that of the ones of the nozzles located closer to the inlet port along the circumferential direction.

17. The compound engine assembly as defined in claim 13, wherein each nozzle of the plurality of nozzles is defined between adjacent ones of a plurality of circumferentially spaced vanes.

18. An inlet guide assembly for a turbine receiving a pulsed flow, the inlet guide assembly comprising a duct having an internal volume and an inlet port and a plurality of nozzles communicating with the internal volume, the inlet port configured to receive the pulsed flow, the plurality of nozzles each defining a respective nozzle area communicating between the internal volume and a flow path of the turbine, the nozzles arranged serially and spaced-apart along a direction of flow through the duct, at least one of the nozzles having a greater nozzle area than at least another one of the nozzles located upstream therefrom.

19. The inlet guide assembly as defined in claim 18, wherein each nozzle has a greater nozzle area than each nozzle located upstream therefrom.

20. The inlet guide assembly as defined in claim 19, wherein each nozzle is defined between adjacent ones of circumferentially spaced apart and commonly-sized vanes, an inter-vane spacing corresponding to each nozzle being greater than an inter-vane spacing of each nozzle located upstream therefrom.

21. The inlet guide assembly as defined in claim 18, wherein each nozzle is defined between adjacent ones of circumferentially spaced apart and commonly-sized vanes, the nozzles including at least a first group of nozzles defined by a first group of the vanes having a first identical inter-vane spacing, and a second group of nozzles defined by a second group of the vanes having a second identical inter-vane spacing, the first group located upstream of the second group, the second inter-vane spacing greater than the first inter-vane spacing.

22. The inlet guide assembly as defined in claim 18, wherein at least one of the nozzles is defined by a plurality of apertures formed through a face of the duct, the nozzle area being a sum of the cross-sectional area of the apertures.

23. A method of introducing a pulsed flow into a flow path of a turbine, the method comprising:
providing a plurality of circumferentially spaced nozzles in communication with the flow path of the turbine, the nozzles defining a greater restriction to the pulsed flow in a first location than in a second location along a circumferential direction of the nozzles; and
directing the pulsed flow along a circumferential path to the first location and then to the second location so that the first location is upstream of the second location, while circulating the flow through the plurality of circumferentially spaced nozzles to the flow path of the turbine.

24. The method as defined in claim 23, wherein directing the pulsed flow includes providing a greater increase in flow velocity of the pulsed flow through the nozzles at the second location as compared to the first location.

* * * * *